United States Patent
Laginess et al.

(10) Patent No.: US 6,436,477 B2
(45) Date of Patent: Aug. 20, 2002

(54) METHOD AND SYSTEM FOR LOW TEMPERATURE CURE OF AUTOMOTIVE REFINISH COATINGS

(75) Inventors: Thomas J. Laginess, Temperance, MI (US); Patrick J. Mormile, Charlotte, NC (US); Lawrence E. Thieben, Waterville, OH (US)

(73) Assignee: Basf Corporation, Southfield, MI (US)

( * ) Notice: Subject to any disclaimer, the term of this patent is extended or adjusted under 35 U.S.C. 154(b) by 0 days.

(21) Appl. No.: 09/771,197

(22) Filed: Jan. 26, 2001

Related U.S. Application Data

(63) Continuation-in-part of application No. 09/032,452, filed on Feb. 27, 1998.

(51) Int. Cl.$^7$ .............................. B05D 3/02; C08J 3/00; C08K 3/20; C08L 75/00; C08F 8/30
(52) U.S. Cl. ................................ 427/372.2; 427/385.5; 524/589; 524/590; 525/123; 525/127; 528/44
(58) Field of Search ................................. 524/589, 590; 525/123, 127; 528/44; 427/372.2, 385.5

(56) References Cited

U.S. PATENT DOCUMENTS

| 5,126,170 A | 6/1992 | Zwiener et al. |
| 5,214,086 A | 5/1993 | Mormile et al. |
| 5,236,741 A | 8/1993 | Zwiener et al. |
| 5,243,012 A | 9/1993 | Wicks et al. |
| 5,412,056 A | 5/1995 | Zwiener et al. |
| 5,623,045 A | 4/1997 | Zwiener et al. |
| 5,852,154 A | 12/1998 | Gras et al. |
| 5,925,711 A | 7/1999 | Wamprecht et al. |
| 5,977,246 A | 11/1999 | Fenn |
| 6,005,062 A | 12/1999 | Hansen et al. |

FOREIGN PATENT DOCUMENTS

| CA | 2048444 | 2/1992 |
| CA | 2221676 | 6/1998 |
| DE | 893 458 A1 | 4/1999 |
| JP | 07-268282 | 10/1995 |

OTHER PUBLICATIONS

Dr. Ch. Zwiener–Dr. M. Sonntag—Dr. L. Kahl, "Asparaginsäureester Eine neue Klasse von Reaktivverdünnern für High–Solids 2K–Polyurethanlacke," pp. 267–270, along with English Abstract.

*Primary Examiner*—Patrick D. Niland
(74) *Attorney, Agent, or Firm*—Anna M. Budde

(57) ABSTRACT

A polyurethane coating is prepared on a substrate using a multi-component coating composition having a first component containing a polyisocyanate material, a second component containing a polymeric polyol, and a third component containing a compound having at least two hindered secondary amine groups by first determining the temperature at curing of the coating will take place and then combining the first and second components and, when the cure temperature is less than about 20° C., particularly less than about 10° C., also combining the third component to prepare a combined coating composition; then applying the combined coating composition to the substrate and curing the applied coating layer.

32 Claims, No Drawings

METHOD AND SYSTEM FOR LOW TEMPERATURE CURE OF AUTOMOTIVE REFINISH COATINGS

This application is a continuation-in-part of U.S. patent application Ser. No. 09/032,452 filed Feb. 27, 1998.

FIELD OF THE INVENTION

The present invention is directed generally to refinish coating compositions and methods. More specifically, the invention concerns refinish coating compositions and methods for colder temperatures, such as below about 20° C.

BACKGROUND OF THE INVENTION

Polyurethane systems have been widely used for many years for refinish coatings. These systems contain hydroxyl-functional resins that react with polyisocyanates to form polyurethanes with excellent film properties including durability, toughness, and solvent resistance. In automotive refinish coating compositions, the polyisocyanates are not blocked so that the reaction with the hydroxyl groups will take place within a reasonable amount of time without heating or with heating at low temperatures of perhaps up to 150° F. Given the reactivity between the unblocked polyisocyanate and the hydroxyl-functional polyol at typical storage temperatures, these materials are segregated into separately stored components until just shortly before application of the coating composition to the substrate to be coated. This type of coating composition, in which the materials that react to cure the coating are segregated in two separately stored components, is referred to in the art as a "two-component" or "two-package" or "2K" coating composition. Automotive refinish coatings may include other separately stored components, such as color components.

While it is advantageous for the reaction between the hydroxyl-functional resin and the polyisocyanate crosslinker to take place slowly enough to provide a usably long pot life (typically a pot life on the order of one to two hours is desirable), polyurethane coatings with long pot lives can take a long time to dry and cure, especially at low temperatures. The pot life test is intended to describe the time after a catalyzed paint sample is mixed when it is still low enough in viscosity that it may still be sprayed. The pot life is the time elapsed until the initial viscosity doubles. The dry time at low temperatures can be shortened by increasing the rate of reaction between polyol and isocyanate with a catalyst, for example by adding an organotin catalyst, but addition of the catalysts known in the art decreases the pot life as well. Further, when the temperature is below about 20° C., a great deal of catalyst is typically added to a coating composition to obtain the desired dry time, which results in a very short pot life. Large amounts of tin catalysts are also undesirable because the catalysts remain in the coating and can also catalyze degradation of the polyurethanes. For example, see Hansen et al., U.S. Pat. No. 6,005,062, column 3. Large amounts of catalyst may also result in "die-back," or loss of gloss, in the cured coating. Further, if the coating cures too quickly, it may have poor adhesion, thought to be an artifact of the rapid shrinkage of the coating during fast curing.

Low molecular weight primary amines have been used in roof coatings to obtain fast cure. The components of these coatings are mixed at the head of the spray gun because, once combined, the coating has no useable pot life. In addition, low molecular weight, primary amine-functional materials are especially not ideal for topcoat coating systems because coatings prepared with them tend to yellow.

Another issue of concern to manufacturers of refinish coatings has been increasing the solids content of refinish coatings compositions to reduce regulated emissions during application of the coatings. Zwiener et al., U.S. Pat. Nos. 5,126,170, 5,236,741, 5,412,056, and 5,623,045, each of which is incorporated herein by reference, disclose two-component coating compositions having a first component containing an isocyanate-functional polyisocyanate and a second component containing a specified secondary amine-functional material referred to as a "polyaspartic acid derivative." The polyaspartic acid derivative is prepared by reacting a compound having two or more primary amines with optionally substituted maleic or fumaric acid esters. The component containing the secondary amine-functional material can optionally include other isocyanate-reactive compounds, such as hydroxy-functional polyacrylates. Coating compositions prepared by combining these two components are said to cure at temperatures of from −20° C. to 100° C., preferably 10° C. to 80° C. Zwiener et al., U.S. Pat. No 5,623,045, describes a two-component coating composition in which the polyaspartic acid derivative component further includes a polyketimine material and not does include any hydroxyl-functional materials.

The mixed material of the Zwiener et al. patents, however, has inadequate pot life, as is discussed in Wicks et al, U.S. Pat. No. 5,243,012, incorporated herein by reference. The Wicks et al, U.S. Pat. No. 5,243,012 discloses that the pot life of a two-component system according to the Zwiener et al., U.S. Pat. No. 5,126,170 can be extended by addition of a tin (IV) compound. The Wicks patent describes the increase in the pot life as surprising because the tin compound is generally considered a catalyst and thus would be expected to shorten the pot life. The tin compound may likewise increase the dry time of the coating composition, however. The Wicks patent describes that all three components of polyisocyanate, polyaspartic acid derivative, and tin (IV) compound may be mixed together to prepare the composition for application, or the tin (IV) compound may be combined first with one of the other components.

Fenn, U.S. Pat. No. 5,977,246, incorporated herein by reference, also describes the compositions with aspartic esters replacing part of the polyol as having very short pot lives and hypothesizes that the diluent aspartic ester may catalyze the reaction between the polyol and the polyisocyanate. The Fenn patent discusses replacement of all of the polyol by the aspartic ester as a way to solve the pot life problem, but states that such compositions produce films that are too brittle, have poor adhesion, and are expensive because of the high cost of the aspartic ester. The Fenn patent resolves the problem of obtaining the desirable high solids available with the aspartic acid, the desirable properties provided by a polymeric polyol, and good pot life by employing a polyester having secondary hydroxyl groups.

Gras et al., U.S. Pat. No. 5,852,154, incorporated herein by reference, describes a cold-curing composition for preparing a polyurea coatings including a polyester- or polyether-based isocyanate-functional prepolymer and a diamine having two secondary amine groups having tert-butyl or 1,1,3,3-tetramethyl isopropyl N-alkyl groups. Curing temperatures are not discussed, but the coatings of the examples are cured "at room temperature for 7 days" in one test and for 14 days in a second test. In the second test, it appears that in some cases half of the secondary amine equivalents was replaced by hydroxyl equivalents. Pot lives of up to about two hours are shown.

Hansen et al., U.S. Pat. No. 6,005,062, incorporated herein by reference, discloses that the reaction products of the Zwiener et al. patents may be subject to hydantoin formation through reaction of the urea hydrogen with an ester group from the aspartic acid derivative moiety, eliminating an alcohol molecule and altering the dimension of the polymer. Shrinkage and cracking of the curing coating is attributed to the hydantoin formation. The Hansen patent proposes preparing the secondary amine compounds with maleic or fumaric acid half-esters, half-amides. The applied coating is said to cure at temperatures from 10° C. to 80° C. The tack-free time is less than five minutes and the pot life appears to be very short, as evidenced by the need in Example 5 to combine the components and apply the coating as quickly as possible.

While most automotive refinish coatings are applied at a facility designed for such work, in which the applications conditions may be controlled to provide moderate temperatures, some refinish customers would prefer to have refinish work done at a location more convenient for them. When the ambient temperature at which the refinish coating is applied corresponds to the temperature used at a refinish facility, then the same refinish coating compositions can be used. In cold weather, however, a different composition, one that can cure at lower temperatures, must be used. There is a need for a method of applying a refinish coating that will shorten the dry time and cure of coating compositions, especially at temperatures below 20° C., but that does not shorten pot life unnecessarily, cause yellowing, or include large amounts of a catalyst that will later catalyze the degradation of the coating as well.

SUMMARY OF THE INVENTION

The invention provides a method for preparing a polyurethane coating from a multi-component coating composition having at least three components, as well as the multi-component coating composition used in the method. In the method, the temperature at which the applied coating is cured is determined and the temperature is used to determine the combination of the components. A first component of the coating composition, containing a polyisocyanate material, is combined with a second component, containing a polymeric polyol. When the temperature determined is not more than about 20° C., particularly when the temperature is not more than about 10° C., then the third component of the coating composition, containing a compound having at least two hindered secondary amine groups, is also combined with the first and second components. For the purposes of the present invention, "hindered secondary amine group" refers to a secondary amine that is bonded directly to two carbon atoms (the alpha carbon atoms), each of which is in turn directly bonded to at least two carbon atoms (the beta carbon atoms). Preferably, no more than two of the beta carbon atoms is directly bonded to more than two carbon atoms.

DETAILED DESCRIPTION OF THE INVENTION

The refinish coating composition includes at least three components. The first component includes a polyisocyanate material, the second component contains a polymeric polyol, and the third component contains an amine compound having at least two hindered secondary amine groups.

In principle, any polyisocyanate known from polyurethane chemistry is suitable as the polyisocyanate material of the first component. Examples of suitable polyisocyanate compounds include, without limitation, alkylene polyisocyanates such as hexamethylene diisocyanate, 2,2,4- and/or 2,4,4-trimethylhexamethylene diisocyanate, dodecamethylene diisocyanate, 1,4diisocyanatocyclohexane, 1-isocyanato-3,3,5-trimethyl-5-isocyanatomethylcyclohexane (isophorone diisocyanate), 2,4'- and/or 4,4'-diisocyanatodicyclohexylmethane, 3-isocyanato-methyl-3,5,5-trimethyl cyclohexyl isocyanate, aromatic polyisocyanates such as 2,4'-and/or 4,4'-diisocyanatodiphenylmethane, mixtures of these isomers with their higher homologs which may be obtained in a known manner by the phosgenation of aniline/formaldehyde condensates, 2,4- and/or 2,6-diisocyanatotoluene, naphthylene diisocyanate, and mixtures of these polyisocyanates. It is preferred to use higher molecular weight derivatives or adducts of those monomeric polyisocyanates. Useful polyisocyanates obtained by reaction of an excess amount of the isocyanate with water, a polyol (for example, ethylene glycol, propylene glycol, 1,3-butylene glycol, neopentyl glycol, 2,2,4-trimethyl-1,3-pentane diol, hexamethylene glycol, cyclohexane dimethanol, hydrogenated bisphenol-A, trimethylolpropane, trimethylolethane, 1,2,6-hexanetriol, glycerine, sorbitol or pentaerythritol), or by the reaction of the isocyanate with itself to give an isocyanurate. Examples include biuret-group-containing polyisocyanates, such as those described, for example, in U.S. Pat. Nos. 3,124,605 and 3,201,372 or DE-OS 1,101,394; isocyanurate-group-containing polyisocyanates, such as those described, for example, in U.S. Pat. No. 3,001,973, DE-PS 1,022,789, 1,222,067 and 1,027,394 and in DE-OS 1,929,034 and 2,004,048; urethane-group-containing polyisocyanates, such as those described, for example, in DE-OS 953,012, BE-PS 752,261 or U.S. Pat. Nos. 3,394,164 and 3,644,457; carbodiimide group-containing polyisocyanates, such as those described in DE-PS 1,092,007, U.S. Pat. No. 3,152,162 and DE-OS 2,504,400, 2,537,685 and 2,552,350; allophanate group-containing polyisocyanates, such as those described, for example, in GB-PS 994,890, BE-PS 761,626 and NL-OS 7,102,524; and uretdione group-containing polyisocyanates, such as those described in EP-A 0,377,177, each reference being incorporated herein by reference.

Especially preferred are aliphatic biurets and isocyanurates, particularly the isocyanurates of hexamethylene diisocyanate and isophorone diisocyanate.

Also useful as the polyisocyanate material are isocyanate-group-containing prepolymers prepared from the monomeric or modified polyisocyanates and polyol compounds. These prepolymers are similar to the urethane group-containing polyisocyanates, but are further extended to make a higher molecular weight material with multiple polyol compounds incorporated in each prepolymer molecule. The prepolymers generally have an NCO content of 0.5 to 30% by weight, preferably 1 to 20% by weight, and are prepared by reacting together a polyisocyanate compound and a polyhydroxy material in an NCO/OH equivalent ratio typically of 1.05:1 to 10:1, preferably 1.1:1 to 3:1.

The isocyanate-functional prepolymers may be prepared using low molecular weight polyhydroxy compounds having a molecular weight of 62 to 299, such as ethylene glycol, propylene glycol, trimethylolpropane and 1,6-dihydroxyhexane; hydroxyl group-containing esters of such polyols with dicarboxylic acids; ethoxylated and/or propoxylated polyhydroxyl compounds; and mixtures of these modified or unmodified polyhydric alcohols.

The polyester polyols are prepared from low molecular weight alcohols, such as those already mentioned, and polybasic carboxylic acids such as adipic acid, sebacic acid, phthalic acid, isophthalic acid, tetrahydrophthalic acid, hexahydrophthalic acid, maleic acid, the anhydrides of these acids, and mixtures of these acids and/or acid anhydrides. Hydroxyl group-containing polylactones, especially poly-ε-caprolactones, are also suitable for the preparation of the prepolymers. Other examples of higher molecular weight polyhydroxyl compounds are polyether polyols. Polyether polyols may be obtained by the alkoxylation of polyols, water, organic polyamines having at least two N—H bonds, and mixtures of these. Preferred alkylene oxides for the alkoxylation reaction are ethylene oxide and/or propylene oxide, which may be used in the alkoxylation reaction alone, in mixture, or in any sequence.

The prepolymers can also be prepared from hydroxyl group-containing polycarbonates, which may in turn be prepared, for example, by reacting simple diols, such as those already mentioned, with phosgene or diaryl carbonates, for example diphenyl carbonates.

The second component includes a polymeric polyol. The polymeric polyol may be a polyester polyol, a polyether polyol, or a polycarbonate polyol such as those already mentioned. Hydroxyl-functional acrylic resins are especially preferred as the polymeric polyol for automotive refinish topcoat compositions, including basecoat and clearcoat compositions. Hydroxyl group-containing acrylic resins having an OH number in the range from 20 to 360 mg KOH/g, more preferably of from 40 to 200 mg KOH/g, and an acid number in the range of from 0 to 80 mg KOH/g, more preferably of from 5 to 50 mg KOH/g, are preferred. Preferred acrylic resins also have a number average molecular weight of about 800 to about 50,000, preferably about 1,000 to about 20,000 and more preferably about 5,000 to about 10,000.

The hydroxyl-functional acrylic resins are prepared from hydroxyl-functional olefinic monomers other monomers copolymerizable therewith. Examples of suitable monomers include, without limitation, acrylic acid, methacrylic acid, crotonic acid, esters, nitriles, and amides of (α,β-ethylenically unsaturated monocarboxylic acids containing 3 to 5 carbon atoms and vinyl esters, vinyl ethers, vinyl ketones, vinyl amides, and vinyl compounds of aromatics and heterocycles. Representative examples include, without limitation, acrylic and methacrylic acid amides and aminoalkyl amides; acrylonitrile and methacrylonitriles; esters of acrylic and methacrylic acid, particularly those with saturated aliphatic and cycloaliphatic alcohols containing 1 to 20 carbon atoms such as methyl, ethyl, propyl, butyl, 2-ethylhexyl, isobutyl, isopropyl, cyclohexyl, tetrahydrofurfuryl, and isobornyl acrylates and methacrylates; mono- and diesters of fumaric, maleic, and itaconic acids, like maleic acid dimethyl ester and maleic acid monohexyl ester; vinyl acetate, vinyl propionate, vinyl ethyl ether, and vinyl ethyl ketone; styrene, (x-methyl styrene, vinyl toluene, 2-vinyl pyrrolidone, p-tert-butylstyrene, acrylic acid, and hydroxyalkyl esters of acrylic acid or methacrylic acid having from 2 to 4 carbon atoms in the hydroxyalkyl radical (such as 2-hydroxyethyl, 2-hydroxypropyl, 4-hydroxybutyl, trimethylolpropane mono-acrylate or methacrylate, and pentaerythritol mono-acrylate or methacrylate), and combinations of these.

As mentioned, the second component may include a polyester polyol. Such polyester polyols may have a number average molecular weight of about 500 to about 10,000, preferably about 1000 to about 5000, and a hydroxyl number from about 10 to about 400 preferably from about 20 to about 200. The polyester polyols may be synthesized by reacting a polycarboxylic acid component including one or more polycarboxylic acids or their esterifiable derivatives, optionally also including monocarboxylic acids, with a polyol component including one or more polyols, optionally also including monools. The polycarboxylic acids may include any of aromatic, aliphatic and cycloaliphate polycarboxylic acids. Examples of suitable polycarboxylic acids include, without limitation, phthalic acid, isophthalic acid, terephthalic acid, halophthalic acids such as tetrachloro- or tetrabromophthalic acid, adipic acid, glutaric acid, azelaic acid, sebacic acid, fumaric acid, maleic acid, trimellitic acid, pyromellitic acid, tetrahydrophthalic acid, hexahydrophthalic acid, 1,2-cyclohexanedicarboxlic acid, 1,3-cyclohexane-discarboxlic acid, 1,4-cyclohexane-dicarboxlic acid, 4-methylhexahydrophthalic acid, endomethylenetetrahydropthalic acid, tricyclodecane-dicarboxlic acid, endoethylenehexahydropthalic acid, camphoric acid, cyclohexanetetracarboxlic acid, cyclobutanetetracarboxylic acid, and the like, as well as combinations of these. The cycloaliphatic polycarboxylic acids may be employed either in their cis or in their trans form or as a mixture of the two forms. Also suitable are the esterifiable derivatives of the above polycarboxylic acids, for example their single or multiple esters with aliphatic alcohols having 1 to 4 carbon atoms or hydroxy alcohols having a to 4 carbon atoms. In addition, it is also possible to employ anhydrides of the above acids.

Optionally, minor amounts of monocarboxylic acids can also be used with the polycarboxylic acids, examples being benzoic acid, tert-butylbenzoic acid, lauric acid, isononanoic acid and fatty acids of naturally occurring oils.

Polyols suitable for the preparation of the polyester polyol include, without limitation, polyhydric alcohols such as ethylene glycol, propanediols, butanediols, hexanediols, neopentyl glycol, diethylene glycol, cyclohexanediol, cyclohexanedimethanol, trimethylpentanediol, ethylbutylpropanediol ditrimethylolpropane, trimethylolethane, trimethylolpropane, glycerol, pentaerythritol, dipentaerythritol, trishydroxyethyl isocyanate, polyethylene glycol, polypropylene glycol, and the like, as well as combinations of these. The polyol component may also include, if desired, minor amounts of monohydric alcohols, for example butanol, octanol, lauryl alcohol, and ethoxylated and propoxylated phenols. Lactones, especially ε-caprolactone, are also suitable for the preparation of the polyesters. Polylactone polyol can be used as a reactant in the polyester synthesis. In another embodiment, a polyester polyol can be modified by reaction with a lactone.

Techniques for preparing polyesters are well known. The reaction is conventionally carried out at temperatures of between 180 and 280° C. in the presence, if desired, of an appropriate esterification catalyst, for example lithium octanoate, dibutyl tin oxide, dibutyltin dilaurate, paratoluene sulfonic acid and the like.

A polyester polyol can also be used as a polyol in the synthesis of a polyurethane polyol. The polymeric polyol may also be a polyether polyol or polycarbonate polyol. Polyether polyols may be obtained by the alkoxylation of polyols (including the acrylic polymer polyols and polyester polyols already described), water, organic polyamines having at least two N—H bonds, and mixtures of these. Preferred alkylene oxides for the alkoxylation reaction are ethylene oxide and/or propylene oxide, which may be used in the alkoxylation reaction alone, in mixture, or in any sequence. Polyether polyols can also be used as a polyol in the synthesis of a polyester or polyurethane polyol. Polycarbonate polyols may also be included in the second component.

The third component includes a compound having at least two hindered secondary amine groups. Preferably, no more than two of the beta carbon atoms is directly bonded to more than two carbon atoms.

In a preferred embodiment, the compound having at least two hindered secondary amine groups may be represented by a structure

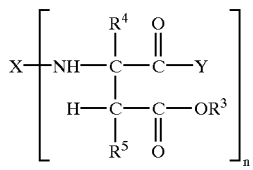

in which X represents an n-valent aliphatic or aromatic radical, preferably a cycloaliphatic radical, preferably having a molecular weight of about 60 to about 6,000, more preferably about 88 to about 322; $R^4$ and $R^5$ may be the same or different and represent hydrogen or alkyl radicals having 1 to about 18, preferably 1 to about 8 and more preferably 1 to about 4 carbon atoms; $R^3$ is an alkyl or aryl radical; Y is $OR^6$, wherein $R^6$ is an alkyl or aryl radical, or Y is $NR^1R^2$, where $R^1$ and $R^2$ are each independently H, alkyl, or aryl, preferably hydrogen or an alkyl of 1 to about 8 carbon atoms; and n is an integer of at least 2, preferably 2 or 3.

Examples of suitable compounds having at least two secondary amine groups are the condensation products of di-primary amine compounds with Michael addition acceptors having a conjugated system. Michael addition acceptors may be represented by the general structure

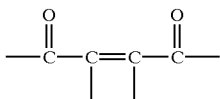

Maleic or fumaric esters and substituted maleic or fumaric esters suitable as Michael acceptors include, without limitation, those of the general formula

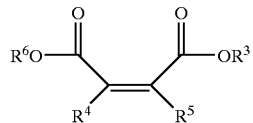

in which $R^4$ and $R^5$ are each independently H, alkyl, or aryl, preferably H or alkyl having from one to about four carbon atoms, and $R^3$ and $R^6$ are each independently alkyl or aryl, preferably alkyl of from one to about eight carbon atoms. Specific preferred examples include maleic acid dimethyl ester, diethyl ester, di-n-propyl or di-isopropyl ester, di-n-butyl ester, di-2-ethylhexyl ester and the corresponding fumaric acid esters. Maleic or fumaric amide-esters or substituted maleic or fumaric amid-esters suitable as Michael acceptors include, without limitation, those of the general formula

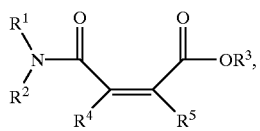

in which $R^1$ and $R^2$ are each independently H, alkyl, or aryl, and $R^3$ to $R^5$ are defined as before. The nitrogen may bear up to about 20 carbon atoms, taking $R^1$ and $R^2$ together, and preferably the nitrogen bears from 1 to about 5 carbon atoms. $R^1$ and $R^2$ together may form a cyclic aliphatic group. These compounds can be prepared by the methods described in Hansen et al., U.S. Pat. No. 6,005,062, incorporated herein by reference.

The di-primary amine compound may be aliphatic, cycloaliphatic, aromatic, or cycloaromatic. Suitable di-primary amines include, without limitation, alkylene diamines such as hexamethylenediamine and 1,8-diaminoctane, the isomers of diaminocyclohexane 2,5-diamino-2,5-dimethylhexane, 1-amino-3,3,5-trimethyl-5-aminomethylcyclohexane, the isomers of 1-methylcyclohexanediamine, other alkyl-substituted cyclohexanediamines such as isopropyl-2,4- and/or -2,6-diaminocyclohexane, 1,3-cyclohexanebis(methylamine), 5-amino-2,2,4-trimethyl-1-cyclopentane-methylamine, 2,4'- and 4,4'-methylenebis(cyclohexylamine), 3,3'-dimethyl-4,4'-methylenebis(cyclohexylamine), the isomers of diaminodicydohexylmethane containing a methyl group as main substituent (monomethyldiaminodicyclohexylmethane), 3(4)-aminomethyl-1-methylcyclohexylamine, and bridged cyclohexanediamines. Preferred primary polyamines may be represented by the following compounds: 1,3-cylcohexanediamine, 1,4-cyclohexanediamine, 1,3-cyclohexanebis(methylamine), 1-amino-3,3,5-trimethyl-5-(aminomethyl)cyclohexane, 4,4'-diaminodicyclohexylmethane, 3,3'-dimethyl-4,4'-methylenebis(cyclohexylamine), 1-methyl-2,4-diaminocyclohexane, 1-methyl-2,5-diaminocyclohexane, 1-methyl-3,5-diaminocyclohexane, 1-methyl-2,6-diaminocyclohexane, the isomers of monomethyldiaminodicyclohexylmethane, and 3(4)-aminomethyl-1-methylcyclohexylamine. Particularly preferred among these are 4,4'-diaminodicyclohexylmethane and 3,3'-dimethyl4,4'-methylenebis(cyclohexylamine).

The preparation of the polyaspartic acid esters or ester amides may be conducted at a temperature of 0° to 100° C. using ratios of the reactants such that there is at least one, preferably about one, olefinic double bond for each primary amino group. Excess starting materials may be separated by distillation after the reaction. The reaction can be carried out in the absence of solvents or alternatively in the presence of suitable solvents, such as methanol, ethanol, propanol, ethyl or butyl acetate or mixtures of these solvents. Preferred compound having at least two hindered secondary amines are available commercially from Bayer, AG under the names Desmophen NH1420 and NH1521.

The third component may further include a tin catalyst or an acid catalyst. Examples of suitable tin catalysts include, without limitation, dialkyl tin oxides such as dibutyl tin oxide and dialkyl tin ester of fatty acids, such as dibutyl tin dilaurate. The tin catalyst, if included, should be included in amounts from about 0.05% to about 0.3% by weight, based on nonvolatile resin weight of the three components combined. A tin catalyst is advantageously included when the temperature at which the applied coating is to be cured is between about 0° C. and about 10° C. Examples of suitable acid catalysts include, without limitation, benzoic acid, carboxylic acids, or weak acids. The acid catalyst, if included, should be included in amounts from about 0.05% to about 0.4% by weight, based on nonvolatile resin weight of the three components combined. An acid catalyst is advantageously included when the temperature at which the applied coating is to be cured is between about 0° C. and about 10° C. When the temperature is about 5° C. or less, both a tin catalyst and an acid catalyst may be used.

The components may also contain other customary materials, including pigments, fillers, solvents, catalysts, stabilizers, slip aids, rheology control agents, dispersing agents, adhesion promoters, UV absorbers, hindered amine light stabilizers, and so on. The pigment or filler may be any organic or inorganic compounds or colored materials, metallic or other inorganic flake materials such as pearlescent mica flake pigments or metallic flake pigments such as aluminum flake, and other materials of kind that the art normally includes in such coatings. Pigments and other insoluble particulate compounds such as fillers are usually used in the composition in an amount of 1% to 100%, based on the total solid weight of binder components (i.e., a pigment-to-binder ratio of 0.1 to 1). The fillers or pigments can be introduced by first forming a mill base with the hydroxyl functional resin utilized in the composition or with other compatible polymers by conventional techniques, such as sandgrinding, ball-milling, attritor grinding, two roll milling to disperse the pigments. The mill base is blended with the film forming constituents as shown in examples that follow.

In the method of the invention, the temperature at which the applied coating is cured is determined. When the cure temperature is not more than about 20° C., particularly not more than about 10° C., then all three components are combined and applied to the substrate to be coated. The ratio of equivalents of the components in the combined coating composition are from about 0.8 to about 1.5 equivalents, preferably from about 0.9 to about 1.3 equivalents, of isocyanate for each equivalent of combined hydroxyl and amine.

The ratio the compound with hindered secondary amines to the polymeric polyol may be from about 1 to about 3 equivalents of amine for each equivalent of hydroxyl. In general, less amine may be used when the temperature is closer to about 20° C. and more amine may be used when the temperature is closer to about 0° C. Preferably, no more than about 3 equivalents of amine from the third component is used for each equivalent of hydroxyl from the second component.

When the cure temperature is more than about 20° C., then the polyisocyanate-containing component and the polymeric polyol-containing components are combined and applied to the substrate, and the third component containing the compound with hindered secondary amines is not used.

While not wishing to be bound by theory, it is believed that the compound with the hindered secondary amines may catalyze the reaction of the polymeric polyol with the polyisocyanate material, but the compound with the hindered secondary amines is not believed to produce any substantial exotherm at the curing temperature. In other words, the applied coating composition does not appear to cure because addition of the hindered secondary amine heats up the applied composition, but rather the composition appears to cure because the addition of the hindered secondary amine lowers the energy of the curing reaction for the coating composition. Of course, the compound with the hindered secondary amines also reacts with the isocyanate groups of the first component, so in that sense it is not a true catalyst.

The combined coating composition may be applied by conventional means to a substrate by conventional methods such as by brush, roller, or spray applications. The substrate can be, for example and without limitation, metal, plastic, wood, or glass. The compositions and the method of the invention are particularly suited to refinishing automotive vehicles and vehicle components.

The invention is further described in the following examples. The examples are merely illustrative and do not in any way limit the scope of the invention as described and claimed. All parts are by volume unless otherwise indicated.

EXAMPLES 1–4 AND COMPARATIVE EXAMPLES A AND B

The dry times between 5° C. and 10° C. of coating compositions prepared and applied according to the method of the invention were compared to coating compositions prepared and applied at those temperatures without component 3 (containing the compounds with at least two hindered amines). The dry times of the coating films were measured by a the BK Drying Recorder, a strip recorder that moves a certain distance over time. The BK Drying Recorder tests film integrity. The tester pulls a 1.5 mm round end rod (held vertically) across the surface of the paint film at a consistent rate. The mark left on the film can be analyzed and the time that the nature of the mark changes can be recorded. Phase 1 is the time when the paint film has set enough that the paint does not flow together again behind the rod after its passage. Phase 2 is the time when the film has set enough that the rod will ride on top of the paint film instead of being pulled through the film. Phase 3 is the time when the rod no longer leaves a visible mark on the film as it is pulled across the film. Phase 4 is the time when the rod has no affect on the film at all and the film is fully cured.

A 2.0 to 2.5 mil (dry) film of each paint example was spray applied to a 1" by 12" glass slide. The slide was immediately placed into the tester and testing was started. The results for each sample were recorded in the table.

First Component Containing a Polyisocyanate Material

Component Ia is a 70% nonvolatile hardener of hexamethylene diisocyanate trimer.

Component Ib is a 60% nonvolatile hardener of hexamethylene diisocyanate trimer.

Second Component Containing a Polymeric Polyol

Component IIa is a solution of a hydroxyl-functional acrylic polymer commercially available from BASF Corporation having a hydroxyl equivalent weight of 975 grams solution/equivalent hydroxyl.

Component IIb is a solution of a hydroxyl-functional acrylic polymer having a hydroxyl equivalent weight of 2350 grams solution/equivalent hydroxyl. The acrylic polymer of component IIb has a higher glass transition temperature than does the acrylic polymer of component IIa.

Third Component Containing a Compound Having at Least Two Hindered Secondary Amine Groups Component IIIa is a solution of the reaction product of one mole of 4,4'-methylene-bis cyclohexane amine with 2 moles of diethyl maleate having an equivalent weight of 705 grams solution/equivalent.

Component IIIb is a solution of the reaction product of one mole of 4,4'-methylene-bis (2-methyl) cyclohexane amine with 2 moles of diethyl maleate having an equivalent weight of 745 grams solution per equivalent.

Solvent Blend

Component IV is a blend of acetates, aromatic hydrocarbons, and naphtha.

TABLE 1

| Component | Comparative Example A | Example 1 | Example 2 | Comparative Example B | Example 3 | Example 4 |
|---|---|---|---|---|---|---|
| Ia | 1 part by volume | 1 part by volume | 1 part by volume | | | |
| Ib | | | | 1 part by volume | 1 part by volume | 1 part by volume |
| IIa | 3 parts by volume | 2 parts by volume | 2 parts by volume | | | |
| IIb | | | | 6 parts by volume | 3 parts by volume | 3 parts by volume |
| IIIa | | 1 part by volume | | | 1 part by volume | |
| IIIb | | | 1 part by volume | | | 1 part by volume |
| IV | 1 part by volume | 1 part by volume | 1 part by volume | 1 part by volume | 1 part by volume | 1 part by volume |
| BK Dry Recorder Dry Times (minutes) at 5° C. to 10° C. | | | | | | |
| Phase #1 | 10 min | 2 min | <2 min | <2 min | <2 min | <2 min |
| Phase #2 | 95 min | 25 min | 120 min | 5 min | 5 min | 5 min |
| Phase #3 | >360 min | 90 min | 300 min | 40 min | 20 min | 105 min |
| Phase #4 | >360 min | >360 min | >360 min | >360 min | 120 min | >360 min |

The results show that the Examples prepared according to the invention provide dry time advantages at the low temperatures, although the drying phase showing improvement may differ according to the other components of the clearcoat.

EXAMPLES 5–8 AND COMPARATIVE EXAMPLES C AND D

The dry times between 5° C. and 10° C. of coating compositions prepared and applied according to the method of the invention were compared to coating compositions prepared and applied at those temperatures without component 3 (containing the compounds with at least two hindered amines), this time with addition of an organotin compound. The dry times of the coating films were again measured by a the BK Drying Recorder.

Components Ia, Ib, IIa, IIb, and IV were the same as used in Examples 1–4 and Comparative Examples A and B. For this test, however, 0.3% by volume of an organotin compound was added to the Components III.

Third Component Containing a Compound Having at Least Two Hindered Secondary Amine Groups Component IIIc is Component IIIa with the addition of 0.3% by volume of an organotin compound.

Component IIId is Component IIIb with the addition of 0.3% by volume of an organotin compound.

TABLE 2

| Component | Comparative Example C | Example 5 | Example 6 | Comparative Example D | Example 7 | Example 8 |
|---|---|---|---|---|---|---|
| Ia | 1 part by volume | 1 part by volume | 1 part by volume | | | |
| Ib | | | | 1 part by volume | 1 part by volume | 1 part by volume |
| IIa | 3 parts by volume | 2 parts by volume | 2 parts by volume | | | |
| IIb | | | | 6 parts by volume | 3 parts by volume | 3 parts by volume |
| IIIa | | 1 part by volume | | | 1 part by volume | |
| IIIb | | | 1 part by volume | | | 1 part by volume |
| IV | 1 part by volume | 1 part by volume | 1 part by volume | 1 part by volume | 1 part by volume | 1 part by volume |
| BK Dry Recorder Dry Times (minutes) at 5° C. to 10° C. | | | | | | |
| Phase #1 | 10 min | 10 min | 10 min | <2 min | <2 min | <2 min |
| Phase #2 | 95 min | 30 min | 90 min | 5 min | 5 min | 15 min |
| Phase #3 | >360 min | 60 min | 165 min | 40 min | 15 min | 45 min |
| Phase #4 | >360 min | 120 min | 285 min | >360 min | 90 min | 150 min |

The results show that the Examples prepared according to the invention provide dry time advantages at the low temperatures. In the compositions with Components Ia and IIa, the advantages were in Phases #3 and #4 of the dry recorder testing. In the compositions with Components Ib and IIb, the advantages were in Phase #4 of the dry recorder testing. Thus, the low temperature dry times are improved further with the addition of the organotin compound.

The invention has been described in detail with reference to preferred embodiments thereof. It should be understood, however, that variations and modifications can be made within the spirit and scope of the invention.

What is claimed is:

1. A method for preparing a polyurethane coating on a substrate, comprising:
    a) providing multi-component coating composition, having a first component comprising a polysocyanate material, a second component comprising a polymeric polyol, and a third component comprising a compound having at least two hindered secondary amine groups;
    b) determining the temperature at curing of the coating will take place;
    c) combining the first and second components and, when temperature determine in step (b) is less than about 20° C., also combining the third component to prepare a combined coating composition;
    d) applying the combined coating composition to form a coating layer on the substrate and curing the applied coating layer;
    wherein the compound having at least two hindered secondary amine groups has a structure

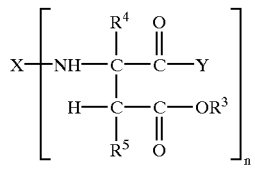

wherein
    X is an n-valent aliphatic or aromatic radical,
    $R^4$ and $R^5$ are each independently hydrogen or alkyl radicals having 1 to about 18 carbon atoms,
    $R^3$ is an alkyl or aryl radical,
    Y is $OR^6$, wherein $R^6$ is an alkyl or aryl radical, or Y is $NR^1R^2$, wherein $R^1$ and $R^2$ are each independently H, alkyl, or aryl, and
    n is an integer or at least 2,
    and with one of the following provisos:
        i) $R^3$ and $R^6$ are not both alkyl, or
        ii) when $R^3$ and $R^6$ are both alkyl, then at least one of $R^4$ and $R^5$ is aryl.

2. A method according to claim 1, wherein the compound having at least two hindered secondary amine groups has no more than two carbon atoms beta to the amine group that are directly bonded to more than two carbon atoms.

3. A method according to claim 1, wherein the polyisocyanate material comprises a member selected from the group consisting of hexamethylene diisocyanate, hexamethylene diisocyanate biuret, the isocyanurate of hexamethylene diisocyanate, isophorone diisocyanate, isophorone diisocyanate biuret, the isocyanurate of isophorone diisocyanate, and combinations thereof.

4. A method according to claim 1, wherein the second component comprises a hydroxyl-functional acrylic resin.

5. A method according to claim 1, wherein the second component comprises a hydroxyl functional acrylic resin having an OH number from 40 to 200 mg KOH/g, an acid number from 5 to 50 mg KOH/g, and a number average molecular weight of from about 5000 to about 10,000.

6. A method according to claim 1, wherein the second component comprises a hydroxyl functional polyester.

7. A method according to claim 1, wherein the third component further comprises a tin catalyst.

8. A method according to claim 7, wherein the tin catalyst comprises dibutyl tin dilaurate.

9. A method according to claim 1, wherein the third component further comprises an acid catalyst.

10. A method according to claim 9, wherein the acid catalyst comprises a weak acid.

11. A method according to claim 9, wherein the acid catalyst comprises benzoic acid.

12. A method according to claim 1, wherein
    X is an n-valent cycloaliphatic radical having a molecular weight of about 60 to about 6,000,
    $R^4$ and $R^5$ are each independently H or alkyl radicals having 1 to about 8 carbon atoms and
    $R^4$ and $R^5$ are each independently H or an alkyl of 1 to about 8 carbon atoms; and
    n is 2 or 3.

13. A method according to claim 12, wherein
    X is an n-valent cycloaliphatic radical having a molecular weight of about 88 to about 322,
    $R^4$ and $R^5$ are each independently H or alkyl radicals having 1 to about 4 carbon atoms, and
    n is 2 or 3.

14. A method according to claim 1, wherein
    X is an n-valent cycloaliphatic radical having a molecular weight of about 60 to about 6,000,
    $R^4$ and $R^5$ are each independently H or alkyl radicals having 1 to about 8 and
    Y is $OR^6$, and
    n is 2 or 3.

15. A method according to claim 14, wherein X is an n-valent cycloaliphatic radical having a molecular weight of about 88 to about 322, $R^4$ and $R^5$ are each independently H or alkyl radicals having 1 to about 4 carbon atoms, and n is 2.

16. A method according to claim 1, wherein the compound having at least two hindered secondary amine groups is the reaction product of a di-primary amine compound and a Michael addition acceptor.

17. A method according to claim 1, wherein the compound having at least two hindered secondary amine groups is the reaction product of 4,4'-methylenebis (cyclohexylamine) with a compound selected from the group consisting of dialkyl maleates and dialkyl formates.

18. A method according to claim 1, wherein the compound having at least two hindered secondary amine groups is selected from the group consisting of 1,3-cylcohexanediamine, 1,4-cyclohexanediamine, 1,3-cyclohexanebis(methylamine), 1-amino-3,3,5-trimethyl-5-(aminomethyl)cyclohexane, 4,4'-diaminodicyclohexylmethane, 3,3'-dimethyl4,4'-methylenebis(cyclohexylamine), 1methyl-2,4-diaminocyclohexane, 1-methyl-2,5-diaminocyclohexane, 1-methyl-3,5-diaminocyclohexane, 1-methyl-2,6-diaminocyclohexane, the isomers of monomethyidiaminodicyclohexylmethane, 3(4)-aminomethyl-1-methyl-cyclohexylamine, and combinations thereof.

19. A method according to claim 1, wherein the third component is combined in a ratio of from about 1 to about 3 equivalents of amine for each equivalent of hydroxyl.

20. A method according to claim 1, wherein, when the temperature determined in step (b) is less than about 20° C., the equivalents of amine from the third component that are combined in the combined coating composition replace equivalents of hydroxyl from the second component in a 1:1 ratio.

21. A method according to claim 20, wherein the combined coating composition has from about 0.8 to about 1.4 equivalents of isocyanate for each equivalent of combined hydroxyl and amine.

22. A method according to claim 20, wherein the combined coating composition has from about 0.9 to about 1.2 equivalents of isocyanate for each equivalent of combined hydroxyl and amine.

23. A multi-component kit for preparing a combined coating composition for application to a substrate, comprising:
(a) a first component comprising a polyisocyanate material,
(b) a second component comprising a polymeric polyol, and
(c) a third component comprising a compound having at least two hindered secondary amine groups;
wherein the compound having at least two hindered secondary amine groups has a structure

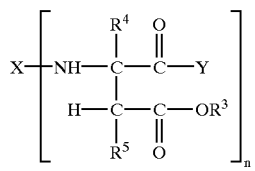

wherein
X is an n-valent aliphatic or aromatic radical
$R^4$ and $R^5$ are each independently hydrogen or alkyl radicals having 1 to about 18 carbon atoms,
$R^3$ is an alkyl or aryl radical,
Y is $OR^6$, wherein $R^6$ is an alkyl or aryl radical, or Y is $NR^1R^2$, wherein $R^1$ and $R^2$ are each independently H, alkyl, or aryl, and
n is an integer or at least 2,
and with one of the following provisos:
i) $R^3$ and $R^6$ are not both alkyl, or
ii) when $R^3$ and $R^6$ are both alkyl, then at least one of $R^4$ and $R^5$ is aryl.

24. A multi-component kit according to claim 23, wherein the compound having at least two hindered secondary amine groups has no more than two carbon atoms beta to the amine group that are directly bonded to more than two carbon atoms.

25. A multi-component kit according to claim 23, wherein the polyisocyanate material comprises a member selected from the group consisting of hexamethylene diisocyanate, hexamethylene diisocyanate biuret, the isocyanurate of hexamethylene diisocyanate, isophorone diisocyanate, isophorone diisocyanate biuret, the isocyanurate of isophorone diisocyanate, and combinations thereof.

26. A multi-component kit according to claim 23, wherein the second component comprises a hydroxyl-functional resin selected from acrylic resins, polyesters, and combinations thereof.

27. A multi-component kit according to claim 23, wherein the third component further comprises a member selected from the group consisting of tin catalysts, acid catalysts, and combinations thereof.

28. A multi-component kit according to claim 23, wherein
X is an n-valent cycloaliphatic radical having a molecular weight of about 60 to about 6,000,
$R^4$ and $R^5$ are each independently H or alkyl radicals having 1 to about 4 and
Y is $OR^6$, and
n is 2.

29. A multi-component kit according to claim 23, wherein the compound having at least two hindered secondary amine groups is the reaction product of 4,4'-methylenebis(cyclohexylamine) with a compound selected from the group consisting of dialkyl maleates and dialkyl formates.

30. A method for preparing a polyurethane coating on a substrate, comprising:
a) providing multi-component coating composition, having a first component comprising a polysocyanate material, a second component comprising a polymeric polyol, and a third component comprising a compound having at least two hindered secondary amine groups;
b) determining the temperature at curing of the coating will take place;
c) combining the first and second components and, when temperature determine in step (b) is less than about 10° C., also combining the third component to prepare a combined coating composition;
d) applying the combined coating composition to form a coating layer on the substrate and curing the applied coating layer;
wherein the compound having at least two hindered secondary amine groups has a structure

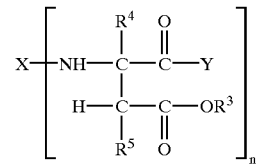

wherein
X is an n-valent aliphatic or aromatic radical,
$R^4$ and $R^5$ are each independently hydrogen or alkyl radicals having 1 to about 18 carbon atoms,
$R^3$ is an alkyl or aryl radical,
Y is $OR^6$, wherein $R^6$ is an alkyl or aryl radical, or Y is $NR^1R^2$, wherein $R^1$ and $R^2$ are each independently H, alkyl, or aryl, and
n is an integer or at least 2,
and with one of the following provisos:
i) $R^3$ and $R^6$ are not both alkyl, or
ii) when $R^3$ and $R^6$ are both alkyl, then at least one of $R^4$ and $R^5$ is aryl.

31. The method of claim 1, wherein Y is not $OR^6$.

32. The multi-component kit of claim 23, wherein Y is not $OR^6$.

* * * * *